United States Patent [19]

Lasson et al.

[11] Patent Number: 5,429,849
[45] Date of Patent: Jul. 4, 1995

[54] POLYMER COMPOSITIONS INTENDED FOR THE MANUFACTURE OF CABLES AND FLEXIBLE PIPES AND ARTICLES BASED ON THESE COMPOSITIONS

[75] Inventors: Pierre Lasson, Brussels; Yves-Julian Lambert, Chaumont-Gistoux; Yves Vanderveken, Leuven; Nestor Maquet, Waha; Vincent Thulliez, Brussels, all of Belgium

[73] Assignee: Solvay (Société Anonyme), Brussels, Belgium

[21] Appl. No.: 188,418

[22] Filed: Jan. 24, 1994

[30] Foreign Application Priority Data

Jan. 25, 1993 [BE] Belgium .............................. 09300070

[51] Int. Cl.⁶ ..................... C08L 27/16; B29D 23/22; B29D 22/00
[52] U.S. Cl. .................. 428/36.9; 428/379; 525/199
[58] Field of Search ................. 525/199; 428/36.9, 379

[56] References Cited

U.S. PATENT DOCUMENTS 3,178,399  4/1965  Lo .
3,769,371 10/1973  Nersasian .
3,864,228  2/1975  Rossetti .
4,094,949  6/1978  Yokokawa et al. .
4,200,568  4/1980  Trautvetter et al. .
4,302,556 11/1981  Endo et al. .
4,642,326  2/1987  Yasamura .
5,109,071  4/1992  Johnson et al. .
5,219,661  6/1993  Mascia et al. .

OTHER PUBLICATIONS

KYNAR © polyvinylidene fluoride–Technical Brochure 1990.

*Primary Examiner*—Carman J. Seccuro, Jr.
*Attorney, Agent, or Firm*—Spencer, Frank & Schneider

[57] ABSTRACT

Polymer compositions based on fluoropolymers intended especially for the manufacture of electrical cables and of flexible pipes, comprising, by weight, (A) from 25 to 75% of PVDF homopolymer;

(B) from 25 to 75% of a thermoplastic copolymer of $VF_2$ and of at least one other fluoromonomer, exhibiting a content of 5 to 25% of this other monomer. This other fluorocomonomer may be in particular CTFE (chlorotrifluoroethylene), HFP (hexafluoropropylene) or TrFE (trifluoroethylene).

Articles produced from these compositions have good mechanical properties at low temperature 5 Claims, No Drawings

POLYMER COMPOSITIONS INTENDED FOR THE MANUFACTURE OF CABLES AND FLEXIBLE PIPES AND ARTICLES BASED ON THESE COMPOSITIONS

BACKGROUND OF THE INVENTION

1. Field of the Invention

The present invention relates to polymer compositions based on fluoropolymers, suitable especially for the manufacture of electrical cables, hollow bodies and flexible pipes intended, for example, for conveying fuels. It also relates to the cables, pipes, hollow bodies and other articles partially or wholly made from these compositions.

2. Description of the Related Art

When they are being used, electrical cables are commonly subjected to both mechanical and thermal stresses which are detrimental to the integrity of their insulation. This explains the usefulness of standards such as the qualification UL 444 (developed by the Underwriters Laboratories Inc.), which is an aging test consisting in subjecting the cables to an elevated temperature (136° C. for the "125° C. rating" and 158° C. for the "150° C. rating") for a number of days (7 to 150 days) and then verifying whether the elongation and the breaking stress have not changed by more than 50%. With a view to manufacturing electrical cables capable of satisfying these standards, one solution consists in sheathing the cables with a layer of PVDF (polyvinylidene fluoride), by itself or combined with other polymeric layers, for example based on polyethylene, PVC or other fluoropolymers. However, PVDF homopolymer is a resin of high rigidity and it is therefore preferable to employ copolymers of $VF_2$ (vinylidene fluoride) and of other fluoromonomers such as HFP (hexafluoropropylene), which are more flexible. However, such copolymers exhibit the disadvantage of a melting temperature which is markedly lower than that of PVDF homopolymer, it being possible for the difference to reach 40° C. It is clear, however, that the melting temperature of the compositions employed should be advantageously higher than the temperatures applied during the aging test described above.

Another application in which excellent thermomechanical properties are required is that of flexible pipes, and in particular that of the conduits for fuel circuits employed in motor-vehicles (fuel lines).

These conduits must conform to many requirements such as, for example:
good chemical resistance and imperviousness to the fuels employed, including those containing methanol,
good impact strength, even at low temperatures,
allowing use temperatures that can reach 100° to 150° C.

PVDF homopolymer excels insofar as permeability is concerned, but has a high rigidity and poor impact strength when cold (dart drop test at −40° C.). Most polyamides (such as PA 12) have inverse properties: good resilience when cold but a permeability that is too high and, furthermore, a limited maximum temperature of use. Polyethylene also exhibits these two latter disadvantages.

A solution that could be envisaged would be to incorporate into PVDF one or more plasticizers intended to improve its mechanical properties at low temperatures, but the problem which then arises, in the case of the conduits for conveying fuels, is that of the extraction of these plasticizers by the fluids being conveyed, and this produces the risk of resulting in a gradual embrittlement of the conduits.

Alternatively, in Belgian Patent 832,851 (Dynamit Nobel A.G.), which relates to a PVDF—elastomeric fluorocopolymer (for example $VF_2$-HFP) mixture, in order to give it high resilience and elongation at break without excessively affecting its heat resistance (the Vicar point), it is strongly recommended to crosslink the elastomer and possibly then to postcure the articles thus produced. These operations naturally require the use of special additives (crosslinking agents, vulcanization accelerators) and of additional stages of manufacture. Furthermore, in this document there is a recommendation against exceeding a copolymer content of more than 30% by weight in such mixtures.

In the context of electrical cables as in that of flexible pipes the present invention is aimed at providing polymer compositions with improved thermomechanical properties which, furthermore, dispense with the use of a plasticizer. In addition, the compositions of the invention have the advantage of not requiring a subsequent crosslinking.

SUMMARY OF THE INVENTION

In the present case the invention relates to polymer compositions based on PVDF homopolymer and on fluorocopolymer, intended especially for the manufacture of electrical cables and of flexible pipes, comprising, by weight:
(A) approximately from 25 to 75% of at least one PVDF homopolymer;
(B) approximately from 25 to 75% of at least one thermoplastic copolymer of $VF_2$ and of at least one other fluoromonomer, exhibiting a content of approximately 5 to 25% by weight of this other monomer.

More precisely, the polymer compositions according to the invention are mixtures comprising:
a) at least one PVDF homopolymer (A) in weight proportions of at least approximately 25%, preferably higher than 30% and not exceeding approximately 75%, preferably lower than 70%, particularly preferably lower than 45% and ideally lower than 40%;
b) at least one thermoplastic copolymer (B) of $VF_2$ (vinylidene fluoride) and of at least one other fluoromonomer, the weight content of this other comonomer in the copolymer being at least approximately 5%, preferably at least 10% and not exceeding approximately 25%, preferably 20%, particularly preferably 17%; this copolymer being present in the mixture in proportions of at least 25%, preferably higher than 30%, particularly preferably higher than 55%, ideally greater than 60% and not exceeding approximately 75%, preferably lower than 70% (by weight). By way of fluorocomonomers that can be employed there may be mentioned especially CTFE (chlorotrifluoroethylene), HFP (hexafluoropropylene) and TrFE (trifluoroethylene) and mixtures thereof. CTFE and HFP give very good results.

By virtue of the incorporation, according to the invention, of the thermoplastic copolymer (B) in the homopolymer (A), the compositions, and hence finally the cables, pipes or other articles which will be made from them, are provided with a permanent plasticization effect and a wide range of use temperatures. To this end it is essential that the copolymer B should be thermoplastic (that is to say, at least in the present context, semi-crystalline) and nonelastomeric. "Elastomeric" is intended to denote, as defined by the ASTM in the Special Technical Publication No. 184, a material that can be stretched, at ambient temperature, to twice its initial length and which, once released, rapidly recovers its initial length to within 10%. Although it may appear surprising that the addition of a thermoplastic copolymer should lead to better plasticization than the addition of an elastomeric copolymer, the examples confirm that only the use of a thermoplastic copolymer (B) results in a significant plasticizing effect, contrary to the use of an elastomeric $VF_2$ copolymer B. It is also observed that such an elastomeric copolymer is found to be immiscible with PVDF, produces only the improvement in the impact strength, and gives a two-phase (heterogeneous) mixture of high rigidity. The compositions according to the invention, on the other hand, can be considered to be the result of a cocrystallisation and are single-phase.

An unexpected and particularly important advantage of such a mixture of homopolymer (A) and of copolymer (B) is that it offers a synergistic effect with regard to its melting temperature and its high-temperature creep resistance (reflected, for example, in its Vicar point), which is not only higher than that of a copolymer alone, at equal overall fluorocomonomer contents, but also than the mean of the melting temperatures of the homopolymer and of the thermoplastic copolymer, weighted using their respective proportions.

To the compositions described above it is also possible to add all the usual additives such as processing aids, pigments, filling materials, fibre reinforcements, electrically conductive particles and the like, without departing from the scope of the present invention.

The compositions of the invention can be obtained by any of the usual techniques for preparing polymer compositions, especially by premixing the various polymers in the form of powders or granules (as well as optionally with the other additives or filling materials), in the desired proportions, before they are subjected to a thermomechanical processing technique such as extrusion, injection moulding, sheathing and the like.

This operating method can be applied either with a view to manufacturing finished products such as, for example, pipes, or, by adding a granulation stage thereto, with a view to having available granules containing the desired polymers, additives and fillers in suitable proportions, which facilitates a subsequent conversion into finished products.

For the reasons set out above, and especially by virtue of their mechanical properties remaining favourable over a wide range of temperatures, the compositions according to the invention show themselves to be particularly suitable for the manufacture Of cables and flexible pipes subjected to severe conditions in use, but this represents only two of their potential applications, other articles made at least partially from these compositions forming the subject of the present invention just as well as the cables and flexible pipes, for example hollow bodies such as fuel tanks or housings for electrical appliances.

The invention is also aimed at providing cables, flexible pipes, hollow bodies and other articles with a number of layers of thermoplastic materials, at least one of these layers consisting of a composition in accordance with the invention. Such objects can be manufactured by many known techniques, such as coextrusion, overmoulding and the like.

DESCRIPTION OF THE PREFERRED EMBODIMENTS

The examples below are aimed at illustrating the invention. Examples 3, 4, 5, 9, 10, 14 and 17 have been produced according to the invention; the other examples (1R, 2R, 6R, 7R, 8R, 11R, 12R, 13R, 15R and 16R) are given by way of comparison.

EXAMPLES

Examples 1R to 5

Superiority of a Homopolymer/Thermoplastic Copolymer Mixture When Compared With a Copolymer Alone Example 1R refers to a PVDF homopolymer (marketed by Solvay under the trade mark Solef® 1010), Example 2R to a thermoplastic $VF_2$-HFP copolymer (Solef 21010), and Example 3 to the mixture of the homopolymer (Solef 1010) with a thermoplastic $VF_2$-HFP copolymer (Solef 21508) in weight proportions of 33:67 respectively. Composition 3 and copolymer 2R thus have an identical overall HFP content. Example 4 corresponds to a mixture of PVDF homopolymer (Solef 1015) with a thermoplastic $VF_2$-CTFE copolymer (Solef 31508) in the proportions of 33:67.

Example 5 corresponds to a mixture of the same polymers (Solef 1015 and 31508) in proportions of 67/33.

In the case of each composition, measurements were made of the elongations at the yield point (Ey) and at break (Eb) at 23° C. (according to ASTM standard D 638), tensile modulus (E) (same standard), the impact strength (Izod, at −40° C., according to ASTM standard D 256) and the glass transition (Tg) and melting temperatures (Tm) [measured by DMTA (dynamic-mechanical thermal analysis) and DSC calorimetry (differential scanning calorimetry) respectively]. Unless the contrary is shown, these same methods of measurement will also be employed in the other examples. The values obtained are recapitulated in Table 1 below.

TABLE 1

| Examples | 1R | 2R | 3 | 4 | 5 |
|---|---|---|---|---|---|
| Ey, % | 7 | 14 | 13 | 14 | 10 |
| Eb, % | 50 | 480 | 410 | 503 | 350 |
| E, % | 2415 | 876 | 879 | 722 | 1300 |
| Izod impact strength, J/m | 31 | 39 | 33 | 1200 | 1000 |
| Tg, °C. | −32 | −29 | −31 | −27 | −28 |
| Tm, °C. | 174 | 144 | 170 | 170 | 173 |

The good properties of the compositions 3, 4 and 5 are found when compared with the copolymer by itself. It is also noted that the melting temperature of composition 3 is much closer to that of the homopolymer 1R ($T_{m1}$) than to that of the copolymer 2R ($T_{m2}$), despite the weight preponderance of copolymer in composition 3.

Comparative Examples 6R and 7R

Disadvantages of the Elastomeric Homopolymer/Copolymer Mixtures

In Examples 6R and 7R compositions were prepared each of which included the same PVDF homopolymer (Solef 1010) and a different Viton ® copolymer, in weight proportions of 75:25. These copolymers, marketed by du Pont, consist essentially of VF$_2$ and HFP, and are of the elastomeric type, and not thermoplastic as in accordance with the present invention. (Viton A is a VF$_2$-HFP copolymer and Viton B70 a VF$_2$-HFP-tetrafluoroethylene terpolymer). The proportions have been chosen so as to compare compositions of the same overall HFP content. A composition containing 33% of PVDF homopolymer and 67% of Viton elastomeric copolymer would furthermore have been impossible to process by thermoplastic melting.

The values measured for these types of compositions are repeated in Table 2 below.

TABLE 2

| Examples | 6R | 7R |
|---|---|---|
| Viton Copolymer | A | B70 |
| Ey, % | 6 | 8 |
| Eb, % | 19 | 37 |
| E, % | 1685 | 1531 |
| Tg, °C. | −31/−13 | −30/−17 |
| Tm, °C. | 173 | 172 |

It is found by comparison with Example 3 that the elastomeric copolymers produce only an extremely weak plasticization effect and mediocre mechanical properties.

Electron transmission (TEM) photomicrographs produced with magnifications of 2000× and 10000× show, furthermore, a modular structure (two-phase, including nodules of approximately 1 μm) in the case of the compositions of Examples 6R and 7R, whereas they show a homogeneous (single-phase) structure in the case of the composition of Example 3, in accordance with the invention.

Examples 8R to 11R

Low Temperature Properties

Various compositions containing PVDF homopolymer as well as, in the case of Examples 9 to 11R, various VF$_2$ copolymers (without plasticizers), all with the same overall fluorocomonomer content where Examples 9 to 11R are concerned, were prepared and tested in respect of their brittleness temperature T$_{brit}$ (measured according to ASTM standard D 746, procedure A). The Viton A resin is a VF$_2$-HFP copolymer with weight proportions of 60:40.

Comparative example 8R refers to PVDF homopolymer alone.

The measured values are recapitulated in Table 3 below.

TABLE 3

| Examples | 8R | 9 | 10 | 11R |
|---|---|---|---|---|
| Copolymer | — | VF$_2$ - HFP | VF$_2$ - CTFE | Viton A |
| content, % | 0 | 65 | 65 | 25 |
| T$_{brit}$ °C. | +8 | −15 | −20 | −2 |

It is found that at the same overall comonomer content the low-temperature behaviour of the compositions containing a thermoplastic copolymer (9, 10) is markedly superior to that of the compositions containing an elastomeric copolymer (11R).

Examples 12R to 14

Permeability to Fuels

Measurements were made of the losses of fuel from tubes made of different materials, 6 mm in internal diameter, 1 mm in thickness and 1 m in length, connected to a tank containing a fuel made up of RF08A85 petrol and methanol in weight proportions of 90:10. The tube of Example 14, in accordance with the invention, is made of Solef 1015 homopolymer and of Solef 31508 VF$_2$-CTFE copolymer in proportions of 33:67.

The losses observed are recapitulated in Table 4.

TABLE 4

| Example | Tube type | Losses (g/m/day) |
|---|---|---|
| 12R | Plasticized polyamide PA 12 | 1.5 |
| 13R | PVDF homopolymer (Solef 1010) | <0.05 (not detectable) |
| 14 | PVDF + copolymer mixture | 0.05 |

Examples 15R to 17

Permeability to Fuels

Measurements were also made of the permeability (expressed in g of CH$_3$OH mm/m$^2$ day) at 50° C., of different films in relation to a fuel made up of RF08A85 petrol and methanol in weight proportions of 65:35. The polymers employed for producing these films are the same as those employed in Examples 12R to 14 respectively.

TABLE 5

| Example | Tube type | Film thickness (mm) | Permeability (gmm/m$^2$ day) |
|---|---|---|---|
| 15R | Plasticized polyamide 12 | 1.01 | 510 |
| 16R | PVDF homopolymer | 0.03 | 6 |
| 17 | PVDF + copolymer mixture | 0.042 | 14 |

It should be noted that the fraction of the fuel which passed through the films made of fluoropolymers contained essentially methanol (>90%), whereas it contained a significant quantity of petrol (18%) in the case of the plasticized PA film.

What is claimed is:

1. A polymer composition based on polyvinylidene fluoride (PVDF) homopolymer and at least one fluorocopolymer, comprising:
    a mixture of fluoropolymers comprised of, by weight:
    (A) from about 25 to about 75% of at least one PVDF homopolymer; and
    (B) from about 25 to about 75% of at least one thermoplastic copolymer comprising vinylidene fluoride (VF$_2$) and from about 5 to about 25% by weight of at least one other fluoromonomer selected from the group consisting of hexafluoropropylene and chlorotrifluoroethylene.

2. An electrical cable, comprising:
    an insulating sheath comprised of at least one layer consisting of a polymer composition according to claim 1.

3. A flexible pipe, comprising:
    at least one layer consisting of a polymer composition according to claim 1.

4. A conduit for fuel circuits, comprising:
    at least one layer consisting of a polymer composition according to claim 1.

5. An article including a hollow body, comprising:
    a polymer composition according to claim 1.

* * * * *